March 27, 1956 P. H. PLANETA 2,739,715
DRAINER BASKET
Filed March 9, 1953
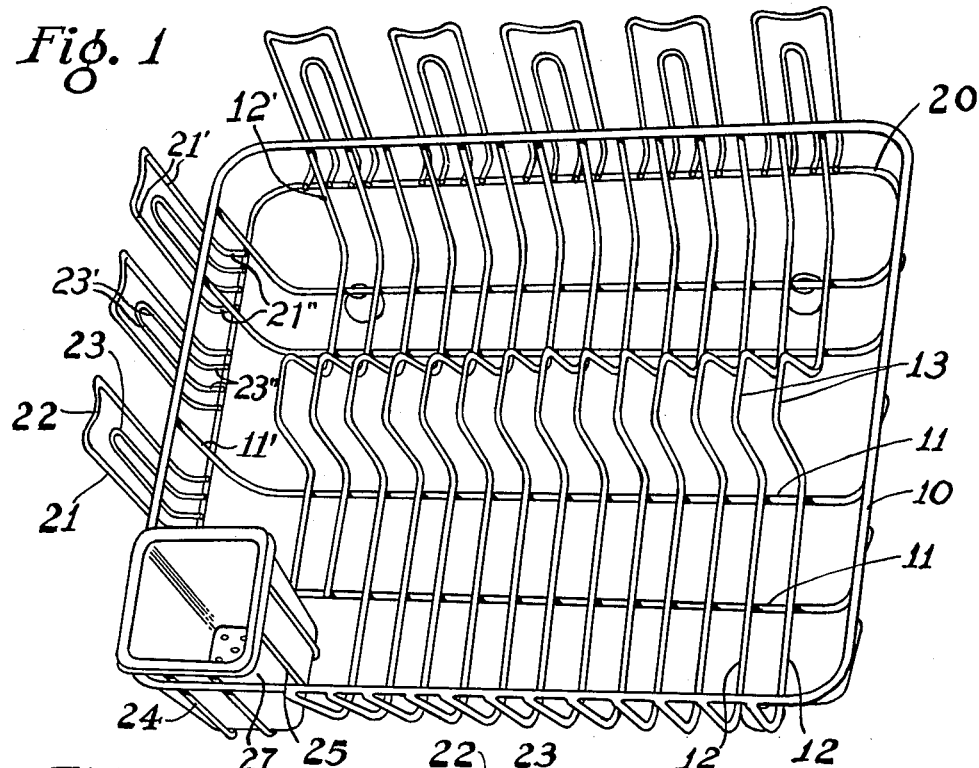
Fig. 1
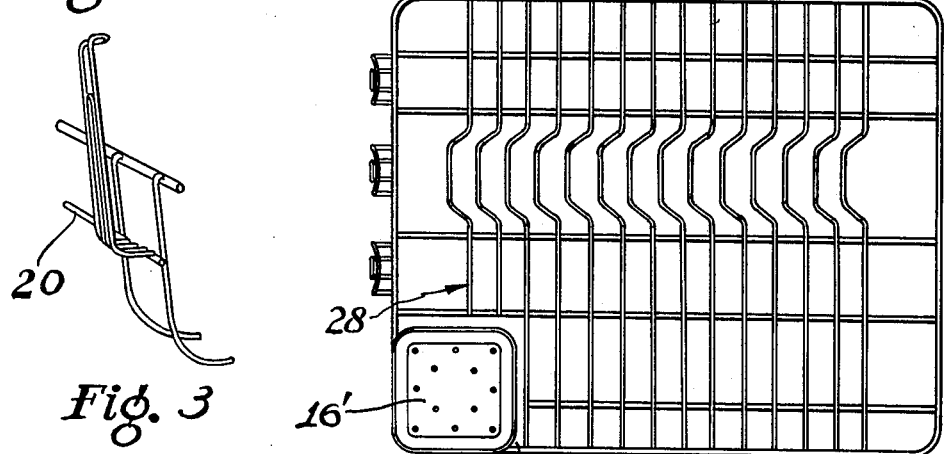
Fig. 4
Fig. 3
Fig. 2
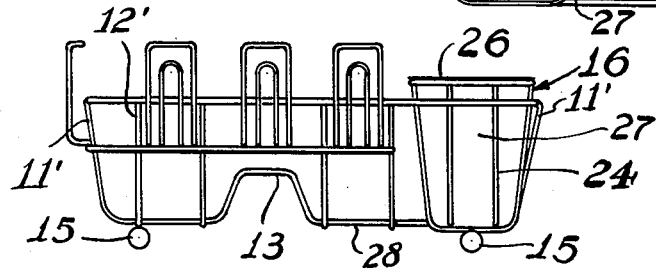
INVENTOR
Paul H. Planeta
BY
William A. Galush
ATTORNEY

United States Patent Office 2,739,715
Patented Mar. 27, 1956

2,739,715
DRAINER BASKET
Paul H. Planeta, East Hampton, Conn.

Application March 9, 1953, Serial No. 341,261

4 Claims. (Cl. 211—41)

My invention relates broadly to wire rack supports, more particularly to dish drainers.

In one form of dish drainer of the wire rack type a rectangularly shaped basket is formed by a plurality of longitudinally extending wires and transverse cross wires the free ends of which extend upwardly and terminate in and are secured to an upper rim. The longitudinal wires of the rack are usually formed to maintain plates in substantially vertical positions or tilted at an angle for draining. A so-called silver tray is usually formed at one end. Usually no provision is made to provide specifically for glasses or cups which, if placed in the rack, reduce the capacity of the rack and subject the cups and glasses to damage from hard silver or metal implements and heavy plates. If provisions are made for supporting the cups and glasses out of the way of the silver and dishes, the rack becomes large and cumbersome, difficult to ship and to store.

In one form of improved rack of prior construction and described in my copending application Serial No. 300,079, filed July 21, 1952, now U. S. Patent No. 2,655,267, dated October 13, 1953, I provide a detachable support which engages the upper rim of the basket and is provided with vertically extending receptacle supports, one form of which includes in each supporting arrangement a pair of U-shaped members for engaging the receptacle and supporting it above and outside of the basket or drainer. Several forms are there disclosed.

The present invention, however, is directed to an improvement over the forms shown in the above-identified application. While protection is afforded cups, glasses and other receptacles by the construction previously disclosed, it is desirable to more fully protect the lips of such cups and glasses. In some cases it may be more convenient to permanently fix the receptacle support to the basket to simplify construction. At the same time it is necessary that the construction be such as to permit nesting for shipment. While it may be desirable in some cases to permanently attach the receptacle support to the drainer basket, it is also desirable to limit the peripheral size of the basket in order to avoid a cumbersome device which cannot easily be handled.

It is therefore an object of my invention to provide an improved dish drainer of the wire rack type having an improved receptacle support.

Another object of my invention is to provide such a drainer basket which is of conventional size and shape but which provides greater capacity for dishes, silver and receptacles such as glasses, cups, and the like.

Another object of my invention is to provide a rack having a supporting means for glasses and cups and other types of receptacles in which maximum protection for the glasses and cups are provided during draining and drying, and which at the same time facilitates such draining and drying.

A still further object of my invention is to provide a combination drainer basket and receptacle which can be nested easily for shipment and for storage.

A still further object of my invention is to provide such an improved device which requires practically no change in present construction of the wire basket drainer but which nevertheless has the added feature of supporting receptacles such as cups and glasses in a convenient position and in a protected position and which in no way interferes with the maximum utilization of the interior of the basket for plates and silver.

A still further object of my invention is to provide a drainer rack with a receptacle support which firmly grips the receptacle being dried during the draining and drying process.

This and other objects will appear hereinafter.

Briefly, the dish drainer with supporting rack made according to my invention includes the usual drainer basket having longitudinal and transverse rod-like elements secured together at these junctions and having up-turned ends secured to an upper rim. In accordance with my invention, I provide an elongated rod-like element secured to the up-turned ends of either the longitudinal or transverse wire-like elements or both at a point preferably midway between the bottom of the basket and the rim member and parallel to the rim member. Secured to this elongated rod-like member are a plurality of pairs of receptacle supporting members including an inner, smaller U-shaped member and a larger outer inverted U-shaped member the legs of which U-shaped members lie in a common plane, the free ends of the U-shaped members being bent to lie in a different plane at an angle to the plane of the legs of the U-shaped members and secured to the elongated rod-like member on the top surface thereof. This provides U-shaped members which are spaced outwardly from the up-turned ends of the transverse and longitudinal wire-like members to lie close to the upper rim of the basket and providing resilient spring-like fingers between which the lips of the glasses and cups may be engaged or over which the cups or receptacles may be placed so that the rim of the cup or glass lies outside of and is protected by the upper rim of the basket and the upwardly turned ends of the longitudinal and transverse wire-like members and the U-shaped members. The basket is larger at the top rim than at the bottom of the basket due to the angular position of the up-turned ends of the wire-like members and permit nesting of one basket within the other to a point where the rim of one basket abuts the elongated rod-like element supporting the receptacle supporting U-shaped members. The silver basket is so formed as to facilitate nesting in a manner to be described.

Other objects of the invention will appear in the following description with reference to the drawing, in which:

Fig. 1 is a perspective plan view of a wire drainer basket and receptacle support made according to my invention;

Fig. 2 is a plan view of Fig. 1;

Fig. 3 is a left-end view in elevation of Fig. 2; and

Fig. 4 is a perspective of details of construction of the receptacle supports.

Referring to the drawing, a drainer basket made according to my invention includes an upper rim member 10 and a plurality of longitudinal extending transverse elements 11 and 12 the ends of which are up-turned and secured to the rim member 10. As best shown in Fig. 3, the up-turned ends 11' and 12' of the wire-like longitudinal extending and transversely extending members 11 and 12 are tilted outwardly so that the bottom 28 of the basket is smaller than the top. The members 12 may be formed with up-turned U-shaped portions 13 between which plates may be positioned to rest in a vertical or slightly angular position while drying. The bottom 28 of the basket may be provided with the ball feet 15.

In accordance with my invention I provide an elongated rod-like member 20 which is secured to the up-turned ends of the members 11 and 12 intermediate the bottom of the basket and the upper rim 10, the rod-like member being parallel to the rim 10. A plurality of receptacle supports are secured to the member 20. Each comprises a smaller inverted U-shaped member 23 and a larger inverted U-shaped member 21, the legs 21' and 23' of which lie in a common plane and the lower ends or free ends 21" and 23" of which are bent inwardly and are secured to the rim 20. The upper end of the outer U-shaped member 21 is curved inwardly as shown at 22 to provide a throat between the members 21 and 23 for readily receiving the lip of a glass or cup between the resilient members. The inwardly curved portion 22 may lie in a plane at an angle to the plane of the legs of the U-shaped member. Members 21 and 23 may grip the cup or glass with a resilient clamping action, or the lip of the glass or cup can be extended into the space or pocket 27 between the basket and the U-shaped members. The members 20, 21 and 23 can be assembled prior to being secured to the basket.

It is noted that the receptacle supporting members 21 and 23 are displaced outwardly from the rim of the basket and provide a space into which the glass or cup may extend so that the lip of the glass or cup is below the upper rim of the basket to be protected thereby and by the up-turned ends of the longitudinal and transversely extending members 11 and 12. The inturned ends of the U-shaped members are preferably secured to the top of the member 20 so that in shipment and in nesting, the end portions of the rim 20 do not come into contact with the legs to cause impressions in the plastic or rubber coating with which the baskets are usually covered.

The drainer basket is formed to provide an open space in the area occupied by the cup-like portion 16 of the basket which supports the plastic cup 16' into which the ends of the silver extend for drying. This arrangement permits the baskets to be nested for shipment, the upper basket being received within the confines of the lower basket with which it is nested. It will be observed that the silver cup 16 comprises a plurality of U-shaped members 24 and 25 which terminate in a rim member 26 the unit being welded to the upper rim 10 of the basket.

While certain specific embodiments have been illustrated and described, it will be understood that various changes and modifications may be made therein without departing from the spirit and scope of the invention.

What I claim is:

1. A basket-like rack member of wire construction having an upper rim member, a plurality of rod-like elements extending transversely of said rim member and having up-turned ends terminating at and connected to opposite sides of said rim member, an elongated rod-like element permanently secured to the up-turned ends of said plurality of said rod-like elements and lying intermediate said rim member and the bottom of said basket-like rack member and spaced below said rim member, a plurality of inverted U-shaped members having the lower leg portions lying at an angle to the remainder of said inverted U-shaped members, the ends of said leg portions being secured to said elongated rod-like element to position said U-shaped members in spaced relation to the outside of said basket-like rack member and to extend vertically upward from said elongated rod-like member whereby a pocket is provided therebetween, said lower leg portions being secured to the upper surface of said elongated rod-like member.

2. A basket-like rack member of wire construction having an upper rim member, a plurality of rod-like elements extending transversely of said rim member and having up-turned ends terminating at and connected to opposite sides of said rim member, an elongated rod-like element permanently secured to the up-turned ends of said plurality of said rod-like elements and lying intermediate said rim member and the bottom of said basket-like rack member and spaced below said rim member, a plurality of inverted U-shaped members having the lower leg portions lying at an angle to the remainder of said inverted U-shaped members and secured to said elongated rod-like element to position said U-shaped members in spaced relation to the outside of said basket-like rack member and to extend vertically upward from said elongated rod-like member whereby a pocket is formed therebetween, said inverted U-shaped members being in pairs, one of the U-shaped members of each pair being smaller than the other, the legs of said U-shaped members lying in common planes, the upper end of the outside U-shaped member being curved inwardly and lying in a plane at an angle to the plane of said legs.

3. A basket-like rack member of wire construction having an upper rim member, a plurality of rod-like elements extending transversely of said rim member and having up-turned ends terminating at and connected to opposite sides of said rim member, a plurality of other rod-like elements extending transversely of the first-mentioned plurality of wire-like elements and in contact therewith and having up-turned ends secured to other opposite sides of said rim member, an elongated rod-like element permanently secured to said up-turned ends of said plurality of said rod-like elements and lying intermediate said rim member and the bottom of said basket-like rack member and parallel to said rim member, said elongated rod-like element being spaced below said rim member, a plurality of inverted U-shaped members having the lower leg portions lying at an angle to the remainder of said inverted U-shaped members and secured to said elongated rod-like element to position said U-shaped members in spaced relation to the outside of said basket-like rack member and to extend vertically upward from said elongated rod-like member, the up-turned ends of said rod-like elements being removed at one corner of said basket to provide an open space of larger dimensions than that between said rod-like members and an elongated cup member secured to the upper rim member in said corner whereby nesting of a plurality of said basket-like rack members is facilitated.

4. A basket-like member of wire construction having an upper rim member, a plurality of rod-like elements extending transversely of said rim member and having up-turned ends terminating at and connected to opposite sides of said rim member, an elongated rod-like element permanently secured to said up-turned ends of said plurality of said rod-like elements and lying intermediate said rim and the bottom of said basket-like rack member and spaced below said rim member, a plurality of inverted U-shaped members having the lower leg portions lying at an angle to the remainder of said inverted U-shaped members and secured to said elongated rod-like element to position said U-shaped members in spaced relation to the outside of said basket-like rack member and to extend vertically upward from said elongated rod-like member, whereby a pocket is provided therebetween.

References Cited in the file of this patent

UNITED STATES PATENTS

| | | |
|---|---|---|
| D. 164,197 | Planeta | Aug. 7, 1951 |
| 489,190 | Groenendyke | Jan. 3, 1893 |
| 1,602,291 | Thibault | Oct. 5, 1926 |